United States Patent [19]

Hioki et al.

[11] Patent Number: 5,442,455
[45] Date of Patent: Aug. 15, 1995

[54] TWO-SIDED VIDEO DISC HAVING HIGH DEFINITION TELEVISION VIDEO SIGNALS RECORDED THEREON AND A METHOD OF MANUFACTURING THE SAME

[75] Inventors: Toshiaki Hioki, Ogaki; Yoshihiko Morita, Takayataishi; Shigekazu Minechika, Kishiwada; Hiroshi Watanabe, Gifu, all of Japan

[73] Assignee: Sanyo Electric Co., Ltd., Moriguchi, Japan

[21] Appl. No.: 112,055

[22] Filed: Aug. 26, 1993

Related U.S. Application Data

[63] Continuation of Ser. No. 691,922, Apr. 26, 1991, abandoned.

[30] Foreign Application Priority Data

Apr. 28, 1990 [JP] Japan ................... 2-114077
Apr. 28, 1990 [JP] Japan ................... 2-114078

[51] Int. Cl.$^6$ ..................... H04N 5/781; H04N 9/797
[52] U.S. Cl. ....................... 358/342; 358/310
[58] Field of Search ............. 358/342, 335, 310, 320, 358/337, 322; 360/22, 33.1; H04N 5/85, 5/781, 9/787; 369/32, 48

[56] References Cited

U.S. PATENT DOCUMENTS 4,577,240  3/1986  Hedberg et al. ............... 360/22
4,706,117 11/1987  Schoolman ..................... 358/342
4,823,196  4/1989  Goddard ........................ 358/342
4,896,311  1/1990  Ishihara ........................ 358/338
4,903,140  2/1990  Okamoto et al. ............... 358/342
4,910,605  3/1990  Sasaki et al. .................. 358/310
5,012,351  4/1991  Isono et al. ................... 358/342
5,111,303  5/1992  Senso et al. ................... 358/335
5,115,323  5/1992  Tachibana et al. ............. 358/310

FOREIGN PATENT DOCUMENTS

61-214244  9/1986  Japan.

Primary Examiner—Tommy P. Chin
Assistant Examiner—Huy Nguyen
Attorney, Agent, or Firm—Nikaido, Marmelstein, Murray & Oram

[57] ABSTRACT

A two-side video disc is manufactured by laminating a top side face disc having a HDTV video signal with red color signal component recorded and a back side face disc having a HDTV video signal with blue color signal component recorded at a position corresponding to the recorded signal on the top side face. Visual end marks are formed at the respective ends of recording tracks of the top side face and back side face discs. The two discs are laminated so that the positions of the end marks coincide with each other. This minimizes deviation in timings between the reproduced signals from the two sides of the disc to reduce significantly the memory capacity of a delay circuit.

11 Claims, 8 Drawing Sheets

TWO-SIDED VIDEO DISC HAVING HIGH DEFINITION TELEVISION VIDEO SIGNALS RECORDED THEREON AND A METHOD OF MANUFACTURING THE SAME

This application is a continuation of application Ser. No. 07/691,922 filed Apr. 26, 1991, abandoned.

BACKGROUND OF THE INVENTION

1. Field of the Invention

The present invention relates to two-side video discs and a method of manufacturing the same, and more particularly, to a video disc having high definition television (HDTV) video signals recorded on both sides and a method of manufacturing such a two-side video disc.

2. Description of the Background Art

Conventionally, a band-division method is used as a method for recording a HDTV video signal having a broad band on a disc record without rotating the same at a special high speed.

When a conventional HDTV signal is recorded by such band-division method, a HDTV video signal of each line is first divided into signals of two channels and then a period of each line is expanded twice as long. Then, a luminance signal component and a line sequential color difference component are time-divisionally multiplexed on each line to form video signals of two channels, so that a recording band of the video signal of each channel is reduced by half.

Two recording laser beams emitted in close proximity are modulated separately by these video signals of narrow record band to form double spiral recording tracks on one side face of the video disc. Because such a recording method divides a HDTV video signal into two channels, the recording band of each channel, i.e. of each recording track on the disc, is a half of that of the HDTV video signal.

When reproducing a HDTV video signal from a video disc having the recording tracks formed in the above described manner, the recorded signals of two channels are separately read from the double spiral recording tracks by two reproduction laser beams emitted in close proximity. The read out signals of the two channels are combined to form the original HDTV video signal.

According to the conventional recording/reproduction method of such a video disc, the record band of each recording track is a half of that of the original HDTV video signal. The rotating speed of the disc at the time of reproduction can be made a half of that of reproducing a HDTV video signal that is recorded without being divided into two channels.

However, the above described conventional example had a disadvantage that video reproduction of a long time period is difficult because the reproduction time period is ½ due to two recording tracks formed on the surface of the disc in comparison with the case wherein only a single recording track is formed.

Furthermore, the above described conventional example had the possibility of the reproduction signals of the two channels from these recording tracks being missing at the same time by dropouts because video signals of two channels are simultaneously recorded on two adjacent recording tracks. It was necessary to subject the signal to be recorded to interleave processing for each recording track to prevent an image from completely being missing in case of occurrence of such dropouts at the proximate lines of the HDTV signal, which led to extremely complicated recording and reproduction circuits.

Japanese Patent Laying-Open No. 61-21424 discloses a stereoscopic video disc where one spiral recording track is formed on the top side face and another is formed on the back side face, in opposite directions, on a video disc. At the time of reproduction, signals are reproduced simultaneously from the two recording tracks on the top and back side faces. According to this background art, it is not necessary to consider the tolerance of the timing of reproduction since two kinds of reproduced signals form respective pictures separately. In addition, this background art does not refer to the recording and reproduction of a HDTV video signal.

SUMMARY OF THE INVENTION

An object of the present invention is to double the continuous reproduction time of a HDTV signal by a single video disc player in comparison with a conventional one.

Another object of the present invention is to prevent HDTV video signals of two channels reproduced from a high definition video disc from being missing simultaneously by dropout.

A further object of the present invention is to make the timings of HDTV video signals of two channels reproduced from both side faces of a two-side video disc having HDTV video signals recorded thereon coincide with each other with a simple configuration.

Briefly stated, the present invention is a two-side video disc including a first recording face recorded with a first video signal including a first color signal component, formed by distributing a line sequential color HDTV video signal having line sequential color signal components alternately by each horizontal line period; and a second recording face recorded with a second video signal including a second color signal component, formed by distributing the line sequential color HDTV video signal alternately by each horizontal line period, without having any tolerance in the rotating direction with respect to the first video signal of the first recording face.

According to another aspect of the present invention, a method of manufacturing a two-side video disc includes the steps of supplying a line sequential color HDTV video signal having line sequential color signal components, distributing the line sequential color HDTV video signal alternately by each horizontal line period to form a first video signal including a first color signal component, distributing the line sequential color HDTV video signal alternately by each horizontal line period to form a second video signal including a second color signal component, recording the first video signal on a single side face of a first disc rotating in a first direction, recording the second video signal on a single side face of a second disc rotating in a second direction opposite to the first direction, and bonding and securing each of the recorded faces of the first and second discs to each other.

According to another aspect of the present invention, the method of manufacturing a two-side video disc further includes the step of making the positions of end marks formed on respective single side faces of the first and second discs coincide with each other in bonding the first and second discs.

According to a further aspect of the present invention, a recording device of a two-side video disc includes a HD-VTR, a recording encoder, a reference signal generating circuit, a disc motor, a motor driving circuit, and an optical recording device. The HD-VTR supplies a HDTV video signal of a wide band and a related address signal. The recording encoder forms a first video signal of a narrow band including a first color signal component and a second video signal of a narrow band including a second color signal component based on the HDTV video signal. The reference signal generating circuit generates a reference signal varying in frequency according to the address signal. The disc motor rotates in one direction at the time of recording of the top side face disc and rotates in an opposite direction at the time of recording of the back side face disc. The motor driving circuit controls the rotating angular velocity of the disc motor so that portions of the first and second video signals common in address are always recorded at the equal angular velocity, according to the rotation information of the disc motor and the reference signal. The optical recording device optically records the first video signal on the disc for top side face at the time of recording of the top side face disc, and optically records the second video signal on the disc for back side face at the time of recording of the back side face disc.

The main advantage of the present invention is that the recording of HDTV video signals two times of that of a conventional system is possible without reversing a disc because HDTV signals of two channels are recorded on the respective side faces of the video disc and reproduced simultaneously at the time of reproduction.

Another advantage of the present invention is that reproduced signals of two channels will not be missing simultaneously by dropout since the HDTV video signals of two channels are recorded separately on the top side face and the back side face of the disc, eliminating the need of particular interleave processing for dropout compensation.

A further advantage of the present invention is that the memory capacity of delay means for timing adjustment of reproduced signals can be reduced significantly because the angular velocity of the signal tracks reproduced from the top side face and the back side face of the disc at the same timing are equal to each other.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Increase in continuous reproduction time period was difficult in the aforementioned conventional example since HDTV video signals of two channels are recorded in a double spiral manner on a single side face of a disc. If video signals of narrow bands of two channels obtained by dividing a HDTV video signal of a wide band, as in the conventional stereoscopic video disc describe in the foregoing, are recorded separately on two side faces of a video disc and reproduced from the recording tracks of the two side faces of the disc simultaneously at the time of reproduction, it is possible to ensure a reproduction time period two times of that of the aforementioned conventional example since only one recording track is formed on each face of the disc.

It is necessary to control the rotation of the video disc so as to achieve the rotating state wherein the angular velocity of the recording track is always constant with respect to the emitted recording laser beam, in order to record a HDTV video signal on the face of the video disc. In other words, it is necessary to continuously vary the rotating speed of the video disc according to the radius from the center of the disc to the recording position on the disc face. In a recording apparatus of a conventional single side recording video disc, the radius of a recording position is obtained by mechanically detecting the position of an optical recording means along the radius direction of the disc.

However, there is always some error in such mechanical position detection. Furthermore, the reference signal generating circuit forming a reference signal used in controlling the disc rotation is susceptible to temperature change, resulting in a reference signal with frequency variation.

If video signals of two channels are separately recorded on respective single side faces of two discs at timings unrelated to each other using a conventional recording apparatus that can not carry out rotation control of the disc in a stable manner, and a two-side recording disc is formed by bonding these two recorded faces of the discs, accurate reproduction of the recorded video signals is not easy to obtain because the angular velocity of the recording track on respective side faces irradiated simultaneously by the reproduction laser beams do not coincide with each other in reproducing the recorded information from both sides of the video disc simultaneously. It is necessary to make the timings of both reproduction video signals coincide by delaying the video signals reproduced from the side faces in order to obtain accurate reproduction of the video signals. With such a recording method of a two-side disc, it is necessary to provide a large memory capacity for delay means to delay reproduced video signals at the time of reproduction.

Even if delay means comprising a large capacity storage means is provided, error may not be sufficiently compensated for only with delay means when the error of timing between the two faces of the disc at the time of recording is too great.

Figure 1:
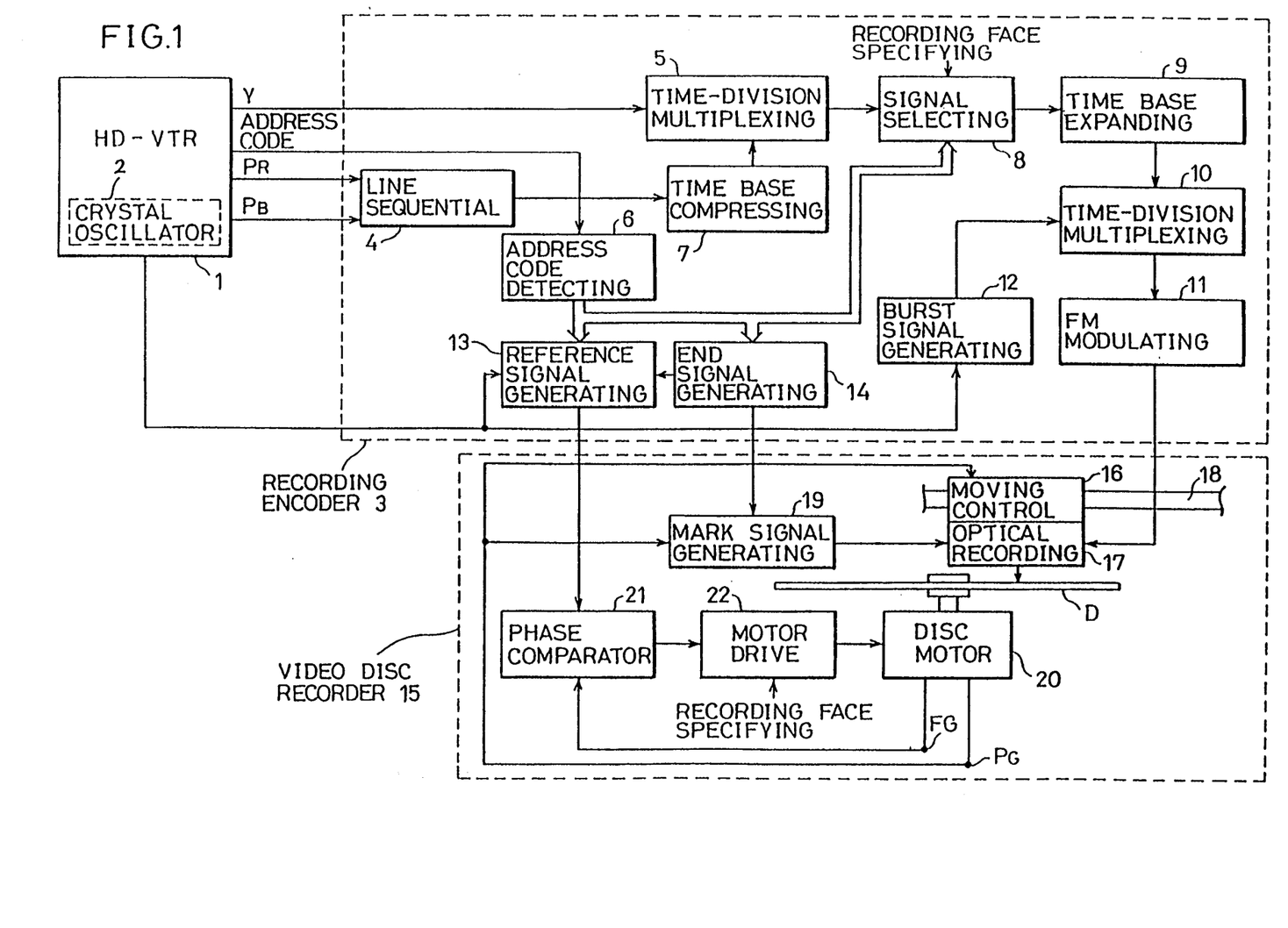
FIG. 1 is a block diagram schematically showing a recording apparatus of a video disc according to an embodiment of the present invention.

FIG. 1 is a block diagram schematically showing a recording apparatus for recording a HDTV video signal on the face of a video disc according to an embodiment of the present invention. FIGS. 2 and 3 are timing charts for explaining the operation of the embodiment of FIG. 1.

In the recording apparatus of FIG. 1, a high definition video tape recorder (HD-VTR) 1 of analog system is employed as the supply source of a HDTV video signal. HD-VTR 1 contains a crystal oscillator circuit 2, whereby a HDTV video signal (frame frequency: 30 Hz, 1125 lines for each frame) recorded on a video tape not shown is reproduced and supplied using an oscillation signal provided from crystal oscillator circuit 2 as a reference signal.

Figure 2A:
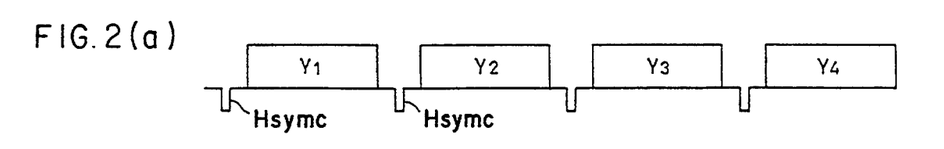
FIGS. 2 and 3 are timing charts for explaining the operation of the embodiment of FIG. 1.
Figure 2B:
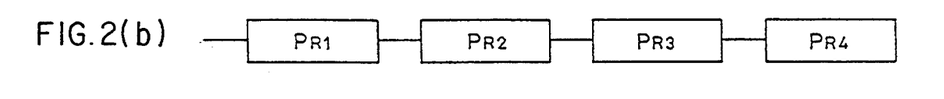
Figure 2C:
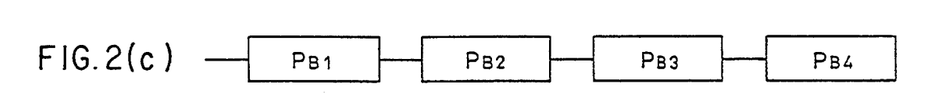
Figure 2D:
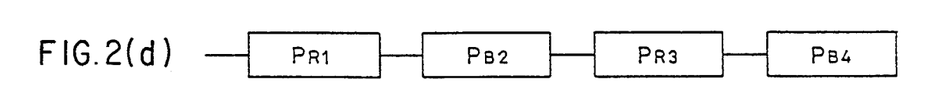
Figure 3A:
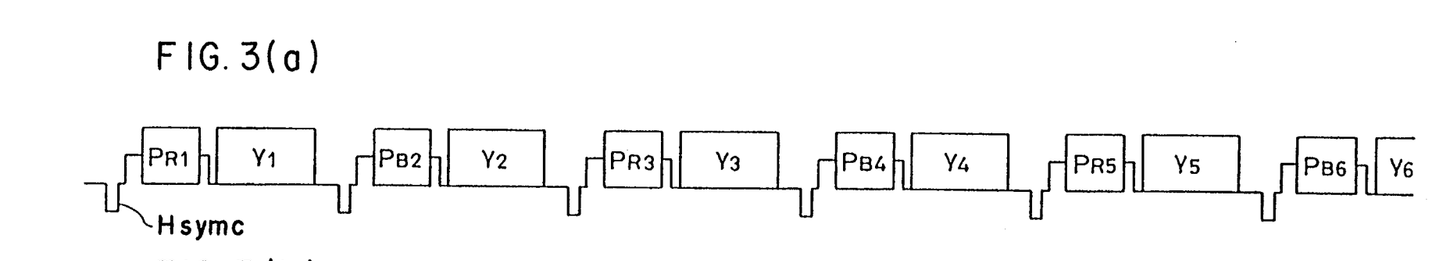

More specifically, the HDTV video signal reproduced by HD-VTR 1 comprises a luminance signal component Y (FIG. 2(a)) having a signal band of 20 MHz, a red color signal component $P_R$ (FIG. 2(b)) having a signal band of 10 MHz, and a blue color signal component $P_B$ (FIG. 2(c)) having a signal band of 10 MHz. In other words, luminance signal component Y continuously comprises luminance signals $Y_1$, $Y_2$, $Y_3$, ... by one horizontal period unit; color signal component $P_R$ continuously comprises color signals $P_{R1}$, $P_{R2}$, $P_{R3}$, ... by one horizontal period unit; and color signal component $P_B$ continuously comprises color signals $P_{B1}$, $P_{B2}$, $P_{B3}$, ... by one horizontal period unit.

In addition to the various video information, HD-VTR 1 reproduces an address code signal of a frame period recorded on the control track of the video tape and provides the same. The oscillation output of 48.6 MHz generated at the aforementioned crystal oscillator circuit is also supplied. This oscillation frequency is equivalent to 1440 times the horizontal frequency of the HDTV video signal.

Figure 2E:
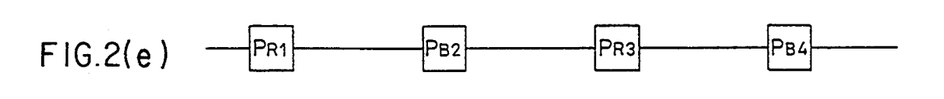

All the various signals provided from HD-VTR 1 are supplied to a recording encoder 3. The address code signal of a frame period is supplied to an address code detecting circuit 6 in recording encoder 3. Address code detecting circuit 6 detects the address code and provides the same to a signal selecting circuit 8, a reference signal generating circuit 13 and an end signal generating circuit 14 constituting recording encoder 3. Color signals $P_R$ and $P_B$ (FIGS. 2(b) and (c)) of two channels are provided to line sequential circuit 4. According to the address code detected by address code detecting circuit 6 and a horizontal synchronizing signal provided from a synchronizing signal detecting circuit not shown, line sequential circuit 4 carries out line sequential processing for selecting alternately by one horizontal period either of color signals $P_R$ or $P_B$ to form a line sequential color signal shown in FIG. 2(d). This line sequential color signal is supplied to a time base compressing circuit 7, whereby the time base thereof is compressed to ½, as shown in FIG. 2(e).

Figure 2F:
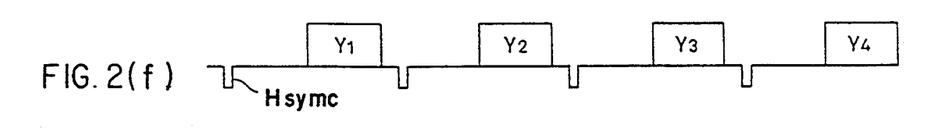
Figure 2G:
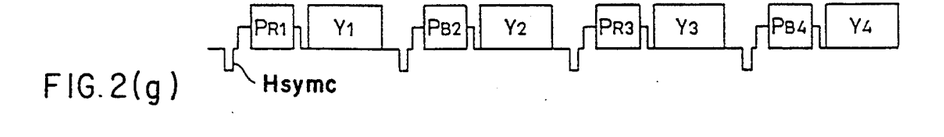

Luminance signal Y (FIG. 2(a)) is supplied to a time-division multiplexing circuit 5, whereby the time base is compressed, as shown in FIG. 2(f). Then, luminance signal Y (FIG. 2(f)) is time-divisionally multiplexed with the line sequential color signal (FIG. 2(e)) having the time base compressed by time base compressing circuit 7. As a result, a one channel HDTV video signal having line sequential color signal components, as shown in FIG. 2(g), is provided from time division multiplexing circuit 5. This signal arrangement is substantially equal to that of the so-called MUSE signal having the band compressed by the MUSE system. It should be noted that there are 1038 effective image lines for each frame, including the video information of this HDTV video signal.

Line sequential HDTV video signal of FIG. 2(g) is supplied to signal selecting circuit 8. According to a recording face specifying signal provided from a control signal source not shown, signal selecting circuit 8 selects a line sequential color HDTV video signal of FIG. 3(a) (identical to the signal of FIG. 2(g)) by every one horizontal line to time divisionally multiplexing an address code in a certain line in the vertical blanking period of the selected HDTV video signal, and provides the same to a time base expanding circuit 9. As a result, two kinds of video signals are formed.

When recording of a HDTV video signal onto a disc face corresponding to one face (side A) of the two-side video disc is specified, signals of the horizontal lines (odd number lines) comprising red color signals $P_{R1}$, $P_{R3}$, $P_{R5}$, ... are selected. When recording to a disc face corresponding to the other face (side B) is specified, only the signals of the horizontal lines (even number lines) comprising blue color signals $P_{B2}$, $P_{B4}$, $P_{B6}$, ... are selected. This means that a HDTV video signal including a color signal of the same color is always recorded on the same face of the disc.

Figure 3B:
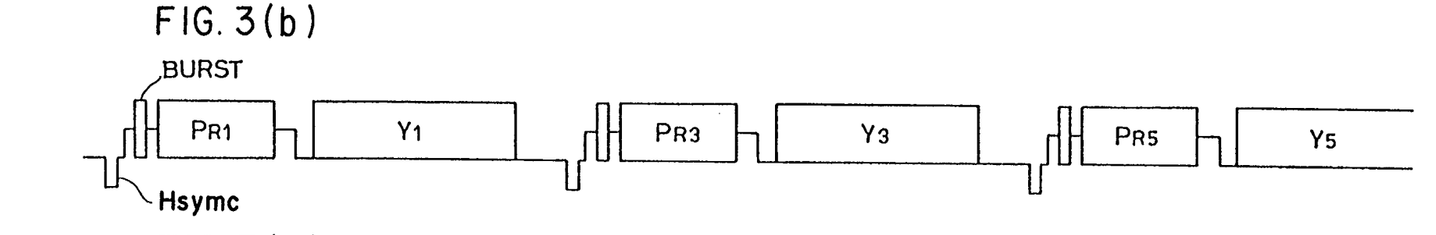
Figure 3C:
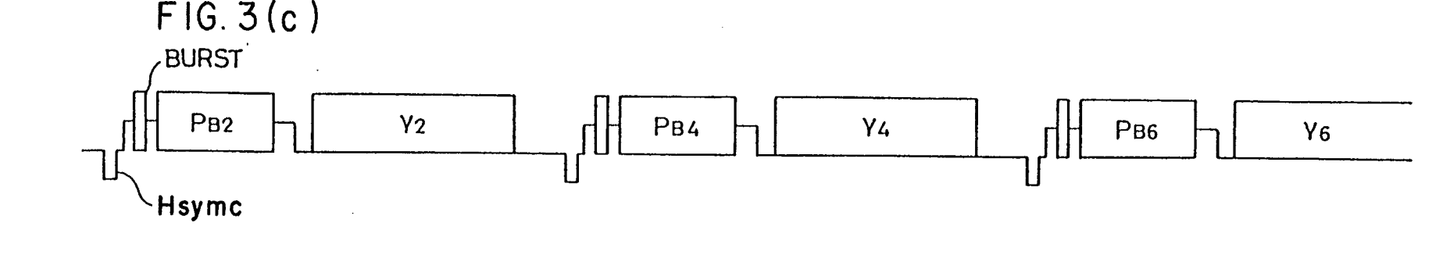

The selected HDTV video signal including a color signal of the same color comprises 519 lines in which the video information exists and has the time base expanded by time base expanding circuit 9 so as to correspond to the line period of the NTSC color video signal. This time base expanded signal is provided to time division multiplexing circuit 10 as a signal having a band of 11.4 MHz. As a result, the time base expanded video signal has the horizontal synchronizing frequency common to that of the NTSC color video signal. A burst signal generating circuit 12 frequency-divided the oscillation output of 48.6 MHz provided from crystal oscillator circuit 2 to generate a pilot signal of 4.62 MHz. This pilot signal is supplied to time division multiplexing circuit 10. Time division multiplex circuit 10 multiplexes this pilot signal for only six periods in the back porch of the HDTV video signal as the burst signal. FIG. 3(b) indicates a recording HDTV video signal comprising only the signals of horizontal lines each having a red color signal, subjected to the above described time base expansion and having burst signal added. This HDTV video signal is formed only when recording to side A, for example, is specified, and is provided to an FM modulating circuit 11. FIG. 3(c) indicates a recording HDTV video signal comprising only the signal of horizontal lines each having a blue color signal, subjected to the aforementioned time base expansion and having burst signal added. This HDTV video signal is formed only when recording to side B of the disc, for example, is specified, and is provided to FM modulating circuit 11.

FM modulating circuit 11 has a FM deviation range set as 13.75–16.25 MHz to FM-modulate the provided HDTV video signal of FIGS. 3(b) or (c). The modulated output of FM modulating circuit 11 is provided to optical recording device 17 in video disc recorder 15.

Reference signal generating circuit 13 of recording encoder 3 generates a reference signal of variable frequency. This reference signal is provided to one input of phase comparator 21 of video disc recorder 15. Disc motor 20 is activated by motor driving circuit 22 at the initial state to rotate disc D at a predetermined angular velocity. When recording of a HDTV signal is commenced, an FG pulse signal having a frequency proportional to the rotating speed of the disc is provided from an FG pulse generator not shown to the other input of phase comparator 21. Phase comparator 21 compares the phases of the reference signal provided from reference signal generating circuit 13 and the FG pulse signal provided from the FG pulse generator to supply a comparison output according to the phase difference to motor driving circuit 22, whereby the rotating speed of disc motor 20 is controlled to correspond to the frequency of the above described reference signal.

Reference signal generating circuit 13 changes the frequency of the reference signal so that the recording angular velocity of the recording track is constant at the time of recording a HDTV video signal onto the face of the disc.

In other words, the reference signal defines the angular velocity of the rotation of the disc according to the address code accompanying the reproduced HDTV video signal provided from HD-VTR 1, i.e. according to the radial position of the recording beam on the disc. Accordingly, the rotating angular velocities of the recording tracks of the same address will always coincide with each other in reproducing a HDTV video signal simultaneously from the top and back side faces of the two-side video disc formed by laminating two discs having HDTV video signals recorded on respective single side faces.

According to the address code provided from address code detecting circuit 6, end signal generating circuit 14 generates an end signal on detecting the end of the HDTV video signal to be recorded. The end signal is provided to reference signal generating circuit 13 and to a mark signal generating circuit 19 in video disc recorder 15.

Moving control device 16 in video disc recorder 15 defines the initial position of optical recording device 17 along the radius direction at the innermost circumference of disc D. On the commencement of recording HDTV video signals onto the disc, a PG pulse signal having a period proportional to the rotation period of the disc is provided from a PG pulse generator not shown to moving control device 16. Moving control device 16 moves optical recording device 17 at a speed proportional to the period of the PG pulse signal along a guide rail 18 towards the direction of the outer circumference of disc D. Instead of the above described PG pulse signal, it is possible to provide a reference signal from reference signal generating circuit 13 to moving control device 16 to move optical recording device 17 at a speed proportional to the frequency of the reference signal or the frequency of a signal obtained by frequency-dividing the reference signal.

Figure 4:
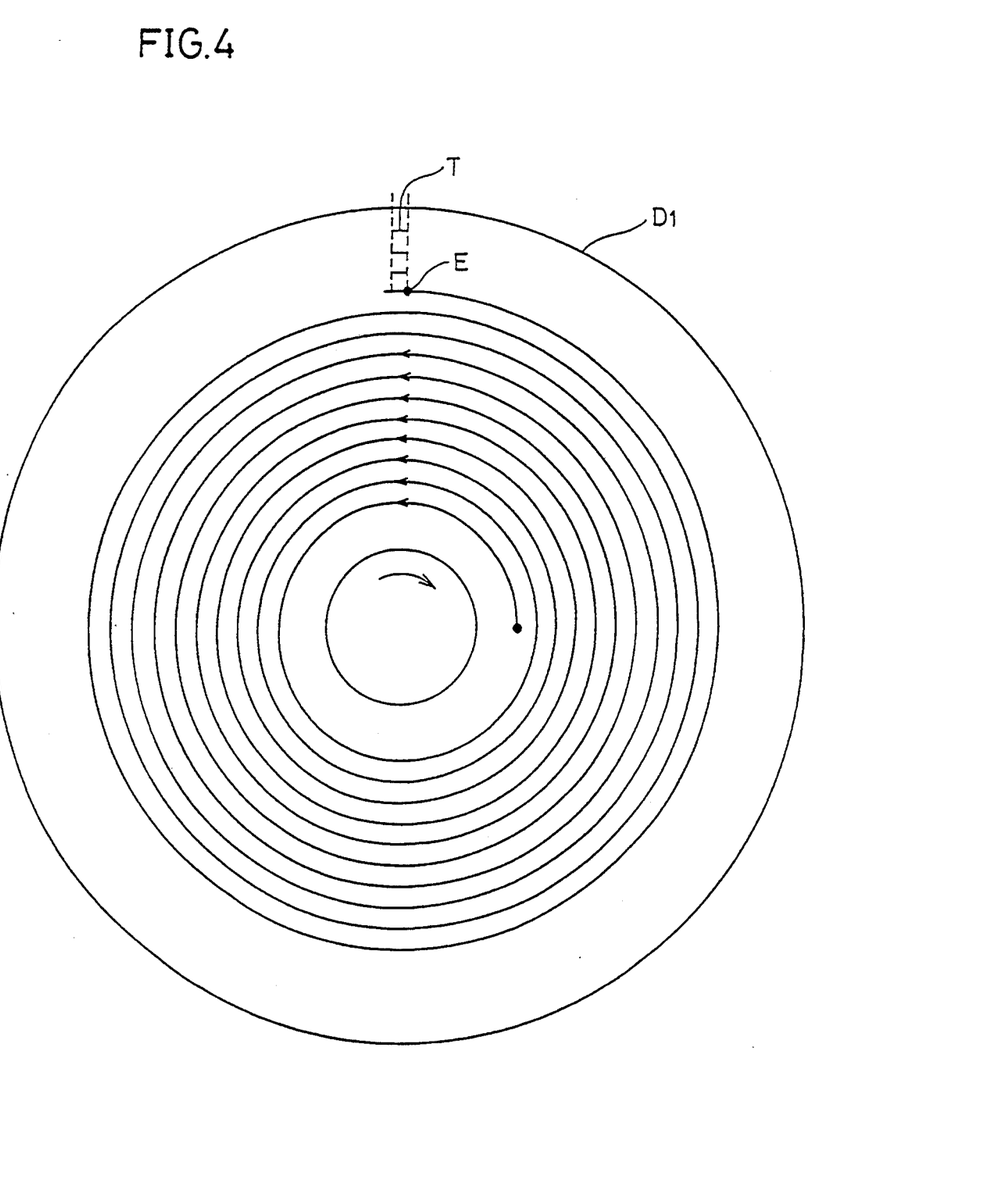
FIGS. 4 and 5 are diagrams schematically showing recording tracks of a two-side video disc according to an embodiment of the present invention.

Optical recording device 17 forms a recording track on a single side face of disc D by optically demodulating the recording laser beam by the HDTV video signal provided from FM modulating circuit 11 and radiating the modulated beam during the period of recording HDTV video signal. On the provision of an end signal from end signal generating circuit 14, mark signal generating circuit 19 detects the period from the generation of the previous PG pulse to the generation of that end signal. Every time a PG pulse is generated, mark signal generating circuit 19 generates for a predetermined period a mark signal of a predetermined recording frequency different from that of the adjacent region, at a timing delayed from the timing of generation of PG pulse by the above detected period to provide the same to optical recording device 17. In response, optical recording device 17 forms an end mark T that can be identified visually at a circumference further outside of end E of the spiral recording track formed on disc D, as shown in FIG. 4.

In response to a recording face specifying signal provided from a control signal source not shown, motor driving circuit 22 inverts the polarity of the drive voltage for driving disc motor 20 to reverse the rotating direction of disc D. When the first disc D1 is mounted in disc recorder 15, a signal specifying the top side face (side A) is applied to motor driving circuit 22 to rotate disc motor 20 clockwise. As shown in FIG. 4, the recording track is formed spirally from the inner circumference towards the outer circumference counter-clockwise with a visual end mark T at a position further outside of end E of the recording track. Color signal $P_R$ and luminance signal Y of every other line (every odd number line), as shown in FIG. 3(b), is recorded on this recording track at this time.

Figure 5:
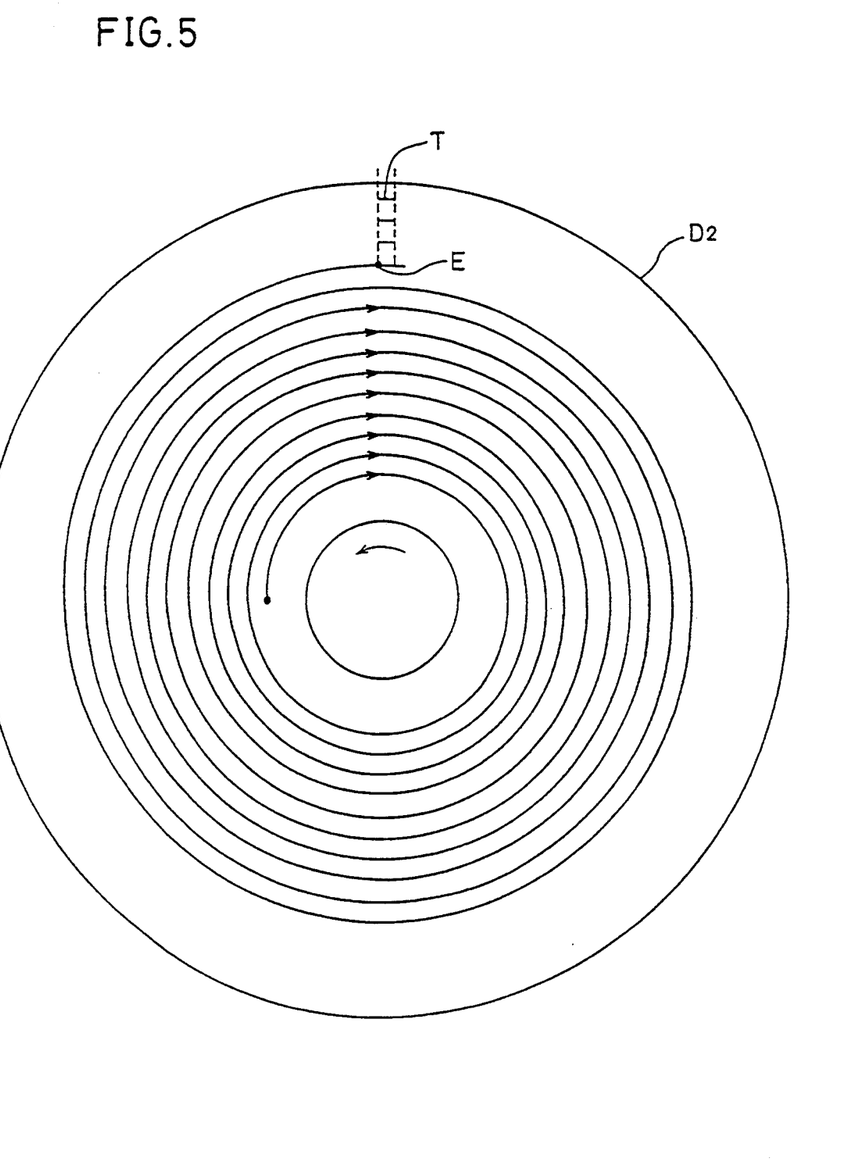

Next, when the second disc D2 is mounted in video disc recorder 15, a signal specifying the back side face (side B) is applied to motor driving circuit 22 to rotate disc motor 20 counter-clockwise. The recording track is formed spirally from the inner circumference towards the outer circumference clockwise, as shown in FIG. 5, with a visual end mark T at a position further outside of end E of the recording track. Color signal $P_B$ and luminance signal Y of every other line (every even number line), as shown in FIG. 3(c), is recorded on this recording track at this time.

Thus, a HDTV video signal is recorded to each face of the disc according to an embodiment of the present invention.

A HD-VTR of analog system is employed as the supply source of a HDTV video signal in the above described recording apparatus of FIG. 1. When a HD-VTR of digital system is used, the band of the luminance signal is 30 MHz and the band of each color signal is 15 MHz. Therefore, a recording apparatus is required having a recording frequency band that is wider than that of the recording device of the above described embodiment to record all the signals provided from the digital system HD-VTR on a video disc.

Next, two discs having HDTV video signals recorded on respective single side faces by the recording apparatus of FIG. 1, or two discs obtained by duplicating these discs, have their signal recorded faces bonded and secured to each other to form a two-side disc. According to an embodiment of the present invention, the position of the end mark on the outermost circumference of the top side face (side A) is made to coincide with the position of the end mark on the outermost circumference on the back side face (side B) in bonding and securing the two discs. If the positions of the end marks of the two faces of the discs are made to coincide with each other, time deviation between signals reproduced from the two signal faces is reduced when reproduction laser beams are emitted in the common radius direction on the top and back side faces of the disc to reproduce simultaneously the recorded HDTV video signals from both faces of the disc. This can reduce significantly the storage capacity of delay means for making the timings between the HDTV video signals of the two channels coincide with each other at the time of reproduction. Furthermore, the possibility of eliminating the provision of such delay means may be considered.

The usage of such end marks as index marks for positioning requires accurate bonding and secure of the two discs using measurement apparatus and the like. However, there are times when precise adhesion and fixation are difficult. There are also times when the timing of recording a HDTV video signal to one face of the disc deviates greatly due to some cause. In this case, the timing of the reproduction information from the top side face of the two-side disc precedes that from the back side face, or the timing of the reproduction information from the back side face precedes on the contrary. In the case of reproducing HDTV video signals from the two faces of such a disc, it is necessary to provide delay means for respective signal paths of the reproduced HDTV video signals of the two channels.

Figure 6:
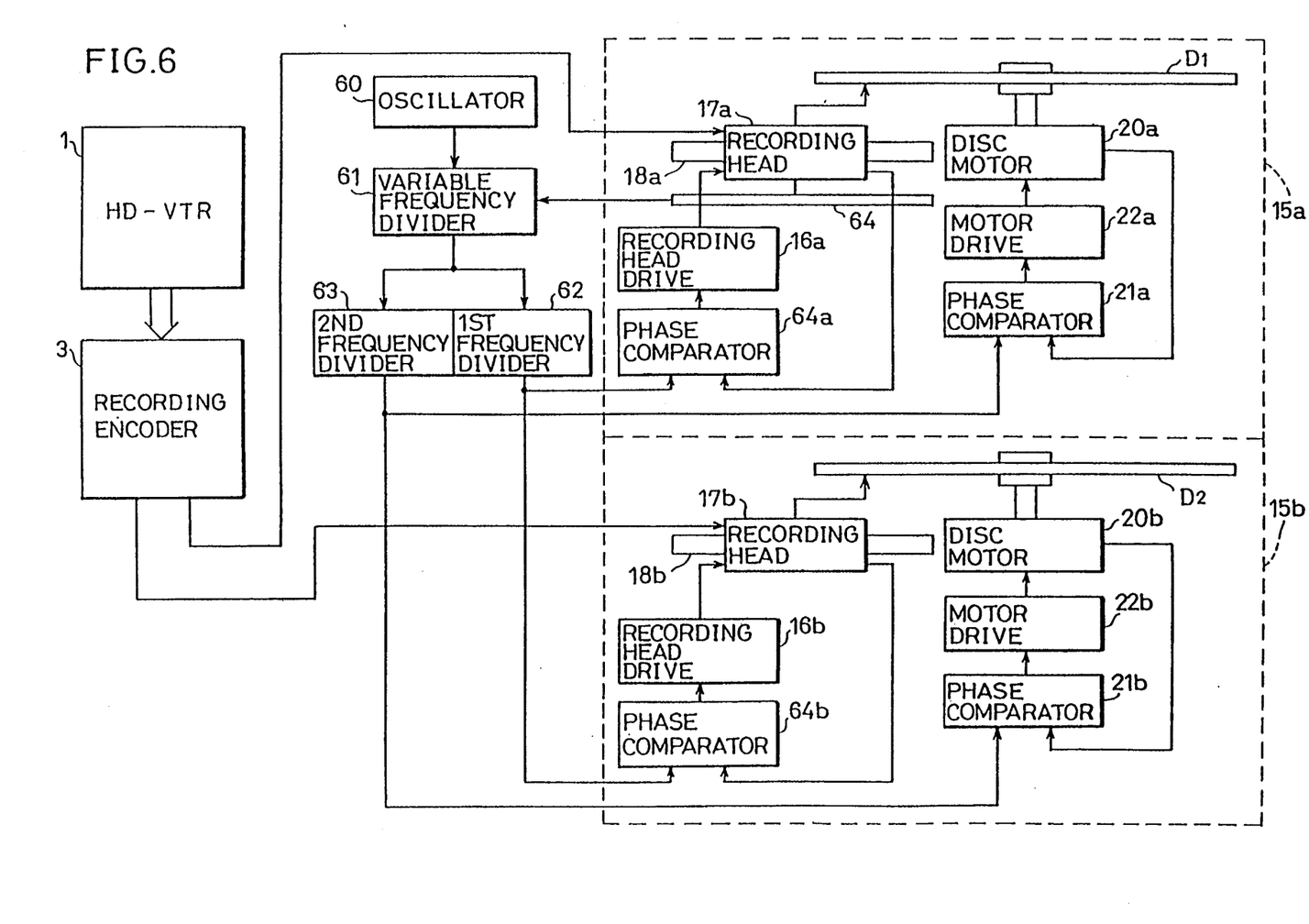
FIG. 6 is a block diagram schematically showing a recording apparatus of a video disc according to another embodiment of the present invention.

Although a two-side video disc is formed by laminating two discs after HDTV video signals are sequentially recorded on respective single side faces of the two discs in the embodiment of FIG. 1, two discs may be laminated together after simultaneously recording HDTV video signals of the two channels on respective single side faces of the two discs while rotating the discs in the respective directions opposite to each other by using two recording apparatus which rotate the discs at the common rotating speed. FIG. 6 is a block diagram showing another embodiment of such a recording apparatus.

Referring to FIG. 6, HDTV video signals (FIGS. 3(b) and (c)) of two channels provided from recording encoder 3 are supplied to an optical recording head 17a of video disc recorder 15a and an optical recording head 17b of a video disc recorder 15b, respectively.

The oscillation output of oscillator 60 is frequency divided with a variable frequency ratio by a variable frequency divider 61 and provided to first and second frequency dividers 62 and 63. The output of the first frequency divider 62 is provided to one inputs of phase comparators 64a and 64b as a first reference signal. The output of the second frequency divider 63 is provided to one inputs of phase comparators 21a and 21b as a second reference signal.

In the initial state, disc motor 20a is activated by a motor driving circuit 22a to rotate disc D1 at a predetermined angular velocity. Upon the commencement of recording HDTV video signal, a FG pulse signal from a FG pulse generator (not shown) contained in disc motor 20a is provided to the other input of phase comparator 21a. Phase comparator 21a compares the phases of the second reference signal provided from the second frequency divider 63 with the FG pulse signal to provide a comparison output according to the phase difference to motor driving circuit 22a. This controls the rotating speed of disc motor 20a to correspond to the frequency of the second reference signal.

Disc motor 20b, motor driving circuit 22b and phase comparator 21b constituting the second video disc recorder 15b simultaneously control the rotating speed of disc D2 in a manner identical to the first ideo disc recorder 15a, according to the second reference signal applied in common to video disc 15a.

Variable frequency divider 61 corresponds to a signal provided from linear scale 64 indicating the radial position of optical recording head 17a to change the frequency of the reference signal so that the recording linear velocity is constant at the time of recording HDTV video signal onto the face of the disc. In other words, phase comparator 64a compares the phases of the rotation detecting pulse provided from head motor (not shown) contained in the recording head 17a with the first reference signal provided from first frequency divider 62. The comparison output according to the phase difference is provided to recording head driving circuit 16a. The above described head motor moves optical recording head 17a along guide rail 18a in a direction from the inner circumference towards the outer circumference. Optical recording head 17a forms a recording track on a single face of disc D1 during the recording period by optically modulating the recording laser beam by the HDTV video signal provided from recording encoder 3.

Optical recording head 17b, recording head driving circuit 16b and phase comparator 64b constituting the second video disc recorder 15b forms a recording track on a signal face of disc D2 in a manner identical to that of the first video disc recorder 15a, according to a first reference signal applied from first frequency divider 62 in common to the first video disc recorder 15a. Thus, the implementation of writing simultaneously HDTV video signals of two channels onto respective single side faces of the two discs being rotated at the common rotating speed can prevent the generation of timing deviation of recording signals between the top side face and the back side face of the disc due to variation in timing of the signals at the time of recording.

Figure 7:
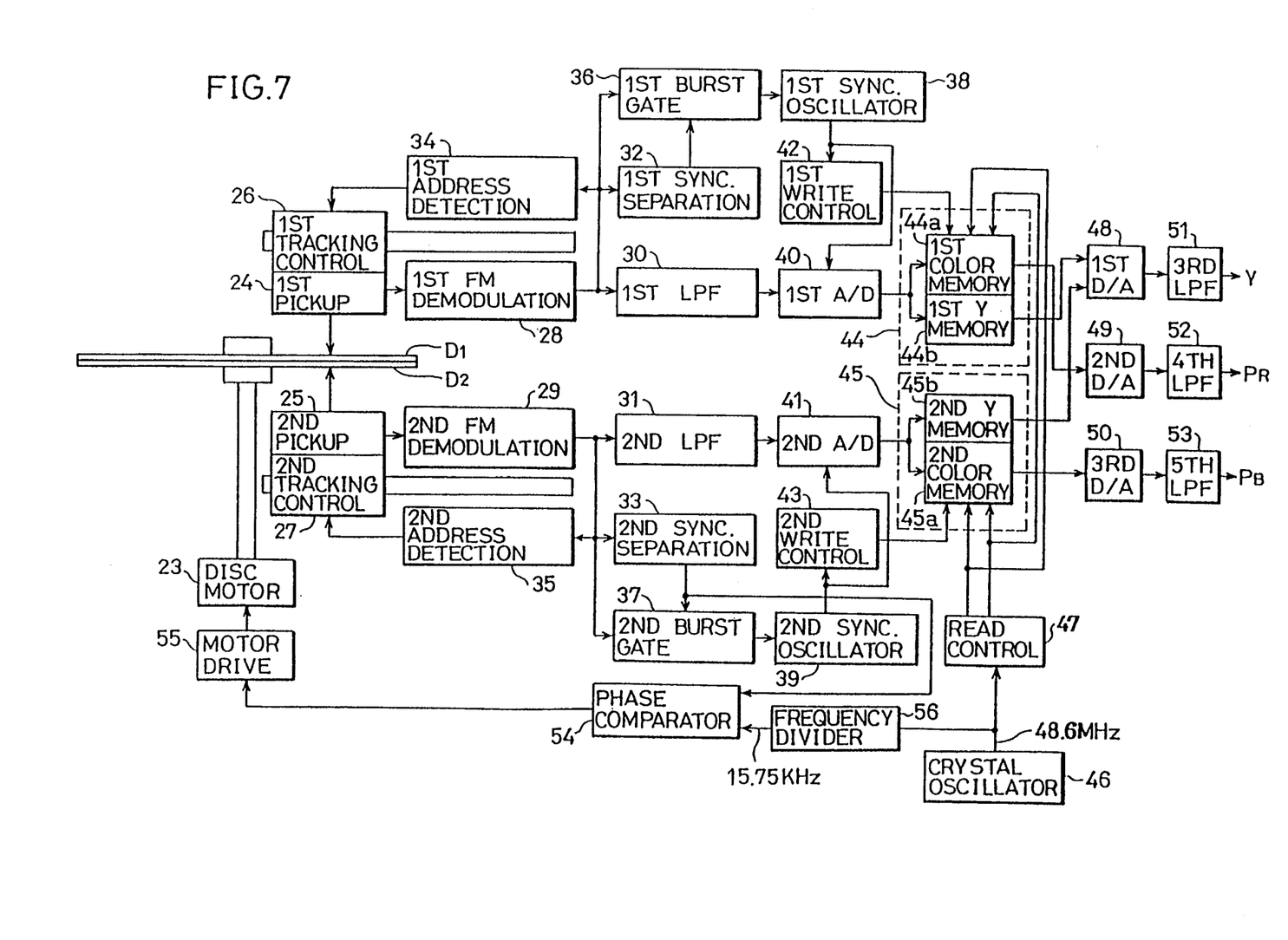
FIG. 7 is a block diagram schematically showing a reproduction apparatus of a video disc according to an embodiment of the present invention.

FIG. 7 is a block diagram schematically showing a reproduction apparatus for reproducing a two-side video disc formed by laminating two discs recorded using the recording apparatus of FIGS. 1 or 6.

Referring to FIG. 7, a two-side disc is set in a reproduction apparatus so that the top face disc D1 is at the upper side and the bottom face disc D2 is at the lower side. Disc motor 23 rotates at a predetermined rotating speed in the initial state. The position of first optical pickup 24 emitting a reproduction laser beam onto the top side face of the disc is defined as the innermost circumference of the top side face by a first tracking control device 26. The position of a second optical pickup 25 emitting a reproduction laser beam on the back side face of the disc is defined as the innermost circumference of the back side face by a second tracking control device 27. In reproduction operation of the reproduction apparatus, the two reproduction laser beams emitted from the two optical pickups are directed to the common position with respect to the radial portion of the top side face and the back side face of the two-side disc.

The HDTV video signals of two channels reproduced by first and second optical pickups are provided to first and second FM demodulating circuits 28 and 29, respectively, to be FM demodulated.

The output of first FM demodulating circuit 28 is provided to a first low pass filter (LPF) 30, a first synchronization separating circuit 32, a first address detecting circuit 34 and a first burst gate circuit 36. Similarly, the output of second FM demodulating circuit 29 is provided to a second LPF 31, a second synchronization separating circuit 33, a second address detecting circuit 35 and a second burst gate circuit 37.

First and second address detecting circuits 34 and 35 respectively detect the address codes multiplexed in the reproduced HDTV video signals to provide the same to the corresponding addressing control devices 26 and 27. Each tracking control device changes the reproduction track so that the timings of detection of the same address code coincide with each other.

First and second synchronization separating circuits 32 and 33 separate the horizontal synchronizing signals in the reproduced HDTV video signals to provide the same as a burst gate pulses to first and second burst gate circuits 36 and 37, respectively. In response to the applied burst gate pulse, each burst gate circuit separates the burst signal multiplexed right after the horizontal synchronizing signal in the reproduced HDTV video signal of each channel to provide the same to a corresponding synchronization oscillator circuit.

First and second synchronization oscillator circuits 38 and 39 convert the applied intermittent burst signals into continuous signals each having a frequency to three times as large as that of applied signal to provide the same as write clock signals.

First and second A/D converting circuits 40 and 41 A/D-convert the low frequency components of the HDTV video signals provided from first and second LPFs 30 and 31 at timings in synchronism with the continuous signals provided from the corresponding oscillator circuits. The outputs are provided to first and second delay circuits 44 and 45 provided for the purpose of jitter correction, timing coincidence, and time base expansion.

The continuous signals provided from first and second synchronization oscillator circuits 38 and 39 are provided to first and second write control circuits 42 and 43 to be converted to write address signals for first and second delay circuits 44 and 45.

First delay circuit 44 comprises a first color memory 44a and a first luminance memory 44b. Color signal $P_R$ and luminance signal Y in the digital HDTV video signal provided from first A/D converting circuit 40 are stored separately in the corresponding memories. The second delay circuit 45 comprises a second color memory 45a and a second luminance memory 45b. Color signal $P_B$ and luminance signal Y in the digital HDTV video signal provided from second A/D converting circuit 41 are separately stored in the corresponding memories.

The read out of signals from these memories will be explained hereinafter. The oscillation output of crystal oscillator circuit 46 is provided to a read out control circuit 47. Read out control circuit 47 provides the read clock formed by this oscillation output to first and second luminance memories 44b and 45b, and first and second color memories 44a and 44b.

Luminance signals Y of every other line stored in luminance memories 44b and 45b are read out alternately from the two memories at a speed two times that of writing. The read out luminance signals are provided to a first D/A converting circuit 48. As a result, a continuous analog luminance signal Y of one channel is provided from first D/A converting circuit 48 to be applied to a third LPF 51 to have the D/A conversion noise removed.

Red color signal of every other line stored in color memory 44a is read out every two times and provided to a second D/A converting circuit 49. As a result, red color signal $P_R$ of the odd number line is read out every two times from second D/A converting circuit 49, and provided to a fourth LPF 52 to have the D/A conversion noise removed.

The blue color signal of every other line stored in color memory 45a is read out every two times and provided to a third D/A converting circuit 50. As a result, blue color signal $P_B$ of the even number line is read out every two times from third D/A converting circuit 50, and provided to a fifth LPF 53 to have the D/A conversion noise removed.

Hence, the HDTV video signals of the two channels simultaneously reproduced from the two sides of the video disc are converted into luminance signal Y, red color signal $P_R$ and blue color signal $P_B$ to be provided simultaneously.

A horizontal synchronizing signal provided from second synchronization separating circuit 33 for controlling the rotating speed of the disc is compared by phase comparison circuit 54 in phase with the reference signal of 15.75 KHz (horizontal synchronizing frequency of NTSC color video signal) obtained by frequency-dividing the oscillation output of crystal oscillator circuit 46 by frequency divider 56. The comparison output indicating the phase difference is provided to motor driving circuit 55 as a control input to control the rotating speed of disc motor 23.

Figure 8:
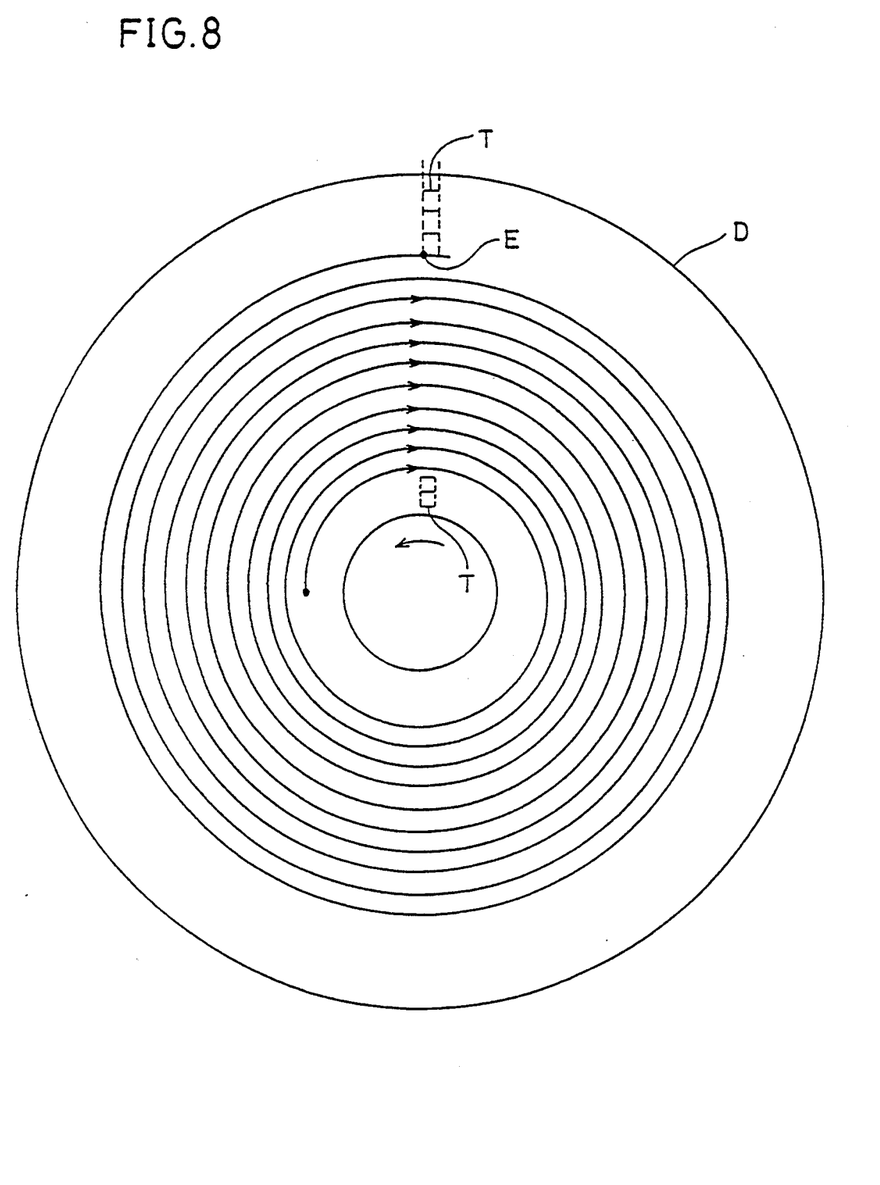
FIG. 8 is a diagram schematically showing recording tracks of a video disc according to another embodiment of the present invention.

Although the visual end mark T is formed in the outermost circumference of the recording face on the disc in the above described embodiment, as shown in FIGS. 4 and 5, the end mark T may be formed at the innermost circumference by moving the pickup to the inner circumference after formation of the recording track. Also, end mark T may be formed at the innermost and outermost circumferences as shown in FIG. 8. Although error in position occurring at the time of laminating two discs having signals already recorded can be minimized with end marks in the outer circumference than those in the inner circumference as described above, there is an advantage that a larger end mark can be formed in the inner circumference.

Although a method of manufacturing a two-side video disc by laminating two discs in which HDTV video signals are directly written by recording laser beams is described in the above embodiment, the present invention is also applicable to the method of manufacturing a two-side video disc by laminating the top side face disc and the back side face disc obtained by duplicating top side face and bottom side face discs having HDTV video signals directly written thereon.

According to the embodiment of the present invention, HDTV signals of two channels are recorded on respective faces of the video disc at the common angular velocity and reproduced simultaneously at the time of reproduction to allow recording/reproduction of HDTV video signals two times as long as that of conventional examples without inverting the disc.

Because HDTV video signals of two channels are recorded separately on the top side face and the back side face of the disc, missing reproduction signals of the two channels due to drop out will not occur simultaneously, eliminating the need of particular interleave processing for drop out compensation.

At the time of signal reproduction, the angular velocities of signal tracks reproduced from the top side face and back side face of the disc at the same timings are equal to each other to reduce significantly the storage memory capacity of delay means for adjusting the timing of the reproduced signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a two-sided video disc having HDTV signals recorded thereon comprising the steps of:

supplying a line sequential color HDTV video signal, distributing said line sequential color HDTV video signal alternately by a horizontal line period to form a first video signal including a first color signal component, distributing said line sequential color HDTV video signal alternately by a horizontal line period to form a second video signal including a second color signal component, recording said first video signal on a single side face of a first disc rotating in a first direction, recording said second video signal on a single side face of a second disc rotating in a second direction opposite to said first direction, and bonding and securing the signal recorded faces of said first and second discs, thereby forming the two-sided video disc.

2. The method of manufacturing a two-side video disc according to claim 1, further comprising the steps of:

forming a visual end mark indicating the end position of said first video signal on the single side face of said first disc, and forming a visual end mark indicating the end position of said second video signal on the single side face of said second disc.

3. The method of manufacturing a two-side video disc according to claim 2, further comprising the step of:

making the positions of the end marks formed on the respective single side faces of said first and second discs coincide with each other in bonding said first and second discs.

4. A method of manufacturing a two-side video disc having HDTV signals recorded thereon comprising the steps of:

supplying a line sequential color HDTV video signal, distributing said line sequential color HDTV video signal alternately by a horizontal line period to form a first video signal including a first color signal component, distributing said line sequential color HDTV video signal alternately by a horizontal line period to form a second video signal including a second color signal component, recording said first video signal on a single side face of a first disc rotating in a first direction, recording said second video signal on a single side face of a second disc rotating in a second direction opposite to said first direction, duplicating said first disc having said first video signal recorded onto a face of a first duplicate disc, duplicating said second disc having said second video signal recorded onto a face of a second duplicate disc, and bonding and securing said first and second duplicate discs obtained by duplicating said first and second discs, thereby forming the two-sided video disc.

5. The method of manufacturing a two-side video disc according to claim 4, further comprising the steps of:

forming a visual end mark indicating the end position of said first video signal on the first duplicate disc, and forming a visual end mark indicating the end position of said second video signal on the second duplicate disc, wherein said first and second duplicate discs are of a constant linear velocity type.

6. The method of manufacturing a two-side video disc according to claim 5, further comprising the step of:

making the positions of the end marks formed on the respective single side faces of the duplicate discs coincide with each other in bonding the discs together.

7. A recording apparatus of a two-side video disc comprising:

means (1) for supplying a HDTV video signal of a wide band and for supplying a related address signal having an address code therein, means (4, 5, 6, 7, 8, 9, 10, 11, 12) for forming a first video signal of a narrow band including a first color signal component and a second video signal of a narrow band including a second color signal component, based on said HDTV video signal, means (13) for generating a reference signal having a frequency changing according to said address signal, disc motor means (20) for rotating in one direction at the time of recording of a top side face disc of the two-side video disc, and rotating in an opposite direction at the time of recording of a back side face disc of said two-side video disc, said top side face disc and said back side face disc being subsequently bonded to form said two-sided video disc, means (20, 21, 22) for controlling the rotating speed of said disc motor means based on rotating information provided by said disc motor means and said reference signal, and means (16, 17, 18) for optically recording said first video signal on said top side face disc at the time of recording of said top side face disc, and optically recording said second video signal on said back side face disc at the time of recording of said back side face disc.

8. The recording apparatus of the two-side video disc according to claim 7, further comprising:

means (14) for detecting the end of each of said first and second video signals, and means (19) for forming a visual end mark at least at one of the outer circumference region and inner circumference region of the signal recording area on the face of the corresponding disc after the detection of the end of each of said first and second video signals.

9. The recording apparatus of the two-side video disc according to claim 8, wherein said means for forming said end mark comprises means (14, 9) for detecting the time difference between the timing of the generation of the rotating information of said disc motor means and the timing of the end detection of each of said first and second video signals, thereby creating a detected time period; and means (19) for supplying a mark signal of a predetermined recording frequency to said optical recording means at a timing delaying said timing of the generation of said rotation information by said detected time period.

10. A recording apparatus of a two-side video disc comprising:

means (1) for supplying a HDTV video signal of a wide band, means (3) for forming a first video signal of a narrow band including a first color signal component and a second video signal of a narrow band including a second color signal component, based on said HDTV video signal, means (17a, 17b) for optically recording said first and second video signals simultaneously on top side face and back side face discs (D1, D2), respectively, means (60, 61, 62, 63) for generating a reference signal having a frequency changing according to the position of said optical recording means, said reference signal being generated based upon a position of the means for optically recording the first and second video signals, first and second disc motor means (20a, 20b) coupled to said reference signal generator means for simultaneously rotating said top side face disc in one direction and said back side face disc in an opposite direction, respectively, at the time of recording said first and second video signals, and means (21a, 21b, 22a, 22b) for controlling the rotating angular speed of said first and second disc motor means based on said frequency of said reference signal so that recording angular velocities of said top side face disc and said back side face disc are equal to each other, said top side face disc and said back side face disc being subsequently bonded together to form the two-sided video disc.

11. A reproduction apparatus of a high definition two-side video disc, said high definition two-side video disc comprising a first recording face having a first video signal including a first color signal component recorded, said first video signal being formed by distributing a line sequential color HDTV video signal alternately by a horizontal line period; and a second recording face having a second video signal including a second color signal component recorded, said second color signal being substantially synchronized in the rotating direction with respect to said first video signal of said first recording face, said second video signal being formed by distributing said line sequential color HDTV video signal alternately by a horizontal line period; said reproduction apparatus comprising:

means (24, 25, 26, 27, 28, 29) for optically reproducing simultaneously said first and second video signals from said first and second recording faces of said high definition two-side video disc, means (40, 41, 42, 43, 44, 45) for temporarily storing at least one of said reproduced first and second video signals to make the timings of said first and second video signals coincide with each other, and means (48, 49, 50, 51, 52, 53) for combining said first and second video signals having the timings coincide with each other to restore said HDTV video signal.

* * * * *